US011465683B2

(12) United States Patent
Kozawa et al.

(10) Patent No.: US 11,465,683 B2
(45) Date of Patent: Oct. 11, 2022

(54) STEERING ANGLE DETECTION DEVICE

(71) Applicant: DENSO CORPORATION, Kariya (JP)

(72) Inventors: Takaharu Kozawa, Kariya (JP); Shuji Kuramitsu, Kariya (JP); Koichi Nakamura, Kariya (JP); Yuki Watanabe, Kariya (JP); Atsuko Oka, Kariya (JP); Toshihiro Fujita, Kariya (JP); Shuhei Miyachi, Kariya (JP); Masaya Taki, Kariya (JP); Toshimitsu Sakai, Kariya (JP); Katsuhiko Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 356 days.

(21) Appl. No.: 16/654,314

(22) Filed: Oct. 16, 2019

(65) Prior Publication Data

US 2020/0047806 A1   Feb. 13, 2020

Related U.S. Application Data

(63) Continuation of application No. PCT/JP2018/015726, filed on Apr. 16, 2018.

(30) Foreign Application Priority Data

Apr. 18, 2017   (JP) .............................. JP2017-082352

(51) Int. Cl.
*B62D 15/02* (2006.01)
*B60R 16/027* (2006.01)
*B62D 5/04* (2006.01)

(52) U.S. Cl.
CPC ........ *B62D 15/0235* (2013.01); *B60R 16/027* (2013.01); *B62D 5/049* (2013.01); *B62D 5/0463* (2013.01)

(58) Field of Classification Search
CPC ................................................... B60R 16/027
See application file for complete search history.

(56) References Cited

U.S. PATENT DOCUMENTS

| 6,038,683 A | 3/2000 | Shimamura et al. |
| 2012/0273290 A1 | 11/2012 | Kawano et al. |

(Continued)

FOREIGN PATENT DOCUMENTS

| JP | H10-271834 A | 10/1998 |
| JP | H11-334470 A | 7/1999 |

(Continued)

*Primary Examiner* — Jeff A Burke
*Assistant Examiner* — Jerrod Irvin Davis
(74) *Attorney, Agent, or Firm* — Maschoff Brennan

(57) ABSTRACT

A steering angle detection device is provided with a plurality of rotation angle sensors and a plurality of control units. The rotation angle sensors are capable of at least continuously calculating a rotation speed while an ignition switch of a vehicle is turned off, and are provided so as to correspond to steering angle calculation units which calculate steering angle based on the rotation speed and a rotation angle acquired from the rotation angle sensors and midpoint information related to the neutral position of a steering member. Power supplies are provided on a per-system basis. The rotation angle sensors or the control units are capable of holding the midpoint information while the ignition switch is turned off. If a power supply abnormality resulting in power supply failure occurs in some of the systems, the control unit of the abnormal system acquires the midpoint information and the rotation speed from the control unit of a normal system when the ignition switch is turned on.

8 Claims, 5 Drawing Sheets

(56) References Cited

U.S. PATENT DOCUMENTS

| | | | | |
|---|---|---|---|---|
| 2014/0353073 A1* | 12/2014 | Banno | ................ | B62D 15/0235 |
| | | | | 180/446 |
| 2015/0175191 A1* | 6/2015 | Harada | .............. | B62D 15/0235 |
| | | | | 701/41 |
| 2015/0239496 A1 | 8/2015 | Kozawa et al. | | |
| 2016/0288823 A1* | 10/2016 | Mikamo | ................ | B62D 5/049 |

FOREIGN PATENT DOCUMENTS

| JP | 2001-328552 A | 11/2001 |
|---|---|---|
| JP | 2004-276834 A | 10/2004 |
| JP | 2006-322794 A | 11/2006 |
| JP | 2010-287127 A | 12/2010 |
| JP | 5389101 B2 | 1/2014 |
| JP | 2015-81013 A | 4/2015 |
| JP | 2015-161584 A | 9/2015 |

* cited by examiner

STEERING ANGLE DETECTION DEVICE

CROSS REFERENCE TO RELATED APPLICATION

The present application is a continuation of International Patent Application No. PCT/JP2018/015726 filed on Apr. 16, 2018, which designated the United States and claims the benefit of priority from Japanese Patent Application No. 2017-82352 filed on Apr. 18, 2017. The entire contents of both of the above applications are incorporated herein by reference.

FIELD

The present disclosure relates to a steering angle detection device.

BACKGROUND

Conventionally, an electric power steering apparatus is provided with a motor that applies a steering assist force on a steering shaft. For example, the conventional electric power steering apparatus uses a motor rotation angle detection device to detect steering angle information.

In the conventional electric power steering apparatus, two regulators are provided to reduce power consumption during an off-state period of an ignition switch. In case that the start switch is in the off-state, the operation of a main computer is stopped but calculation of a motor rotation angle is continued by a sub computer.

SUMMARY

The present disclosure provides a steering angle detection device, which includes a plurality of rotation angle sensors and a plurality of control units forming a plurality of systems. Each rotation angle sensor includes a sensor element for detecting a rotation state of a motor connected to a steering system, calculating a rotation angle of the motor based on a detection signal of the sensor element, calculating a rotation number indicating a number of rotations of the motor based on the detection signal of the sensor element, and communicating a sensor signal including information related to the rotation angle and the rotation number. Each control unit includes a steering angle calculation unit for calculating a steering angle based on midpoint information related to a neutral position of a steering member in addition to the rotation number and the rotation angle acquired from a corresponding one of the plurality of rotation angle sensors.

BRIEF DESCRIPTION OF THE DRAWINGS

The above and other objects, features and advantages of the present disclosure will become more apparent from the following detailed description made with reference to the accompanying drawings. In the drawings.

EMBODIMENT

Figure 1:
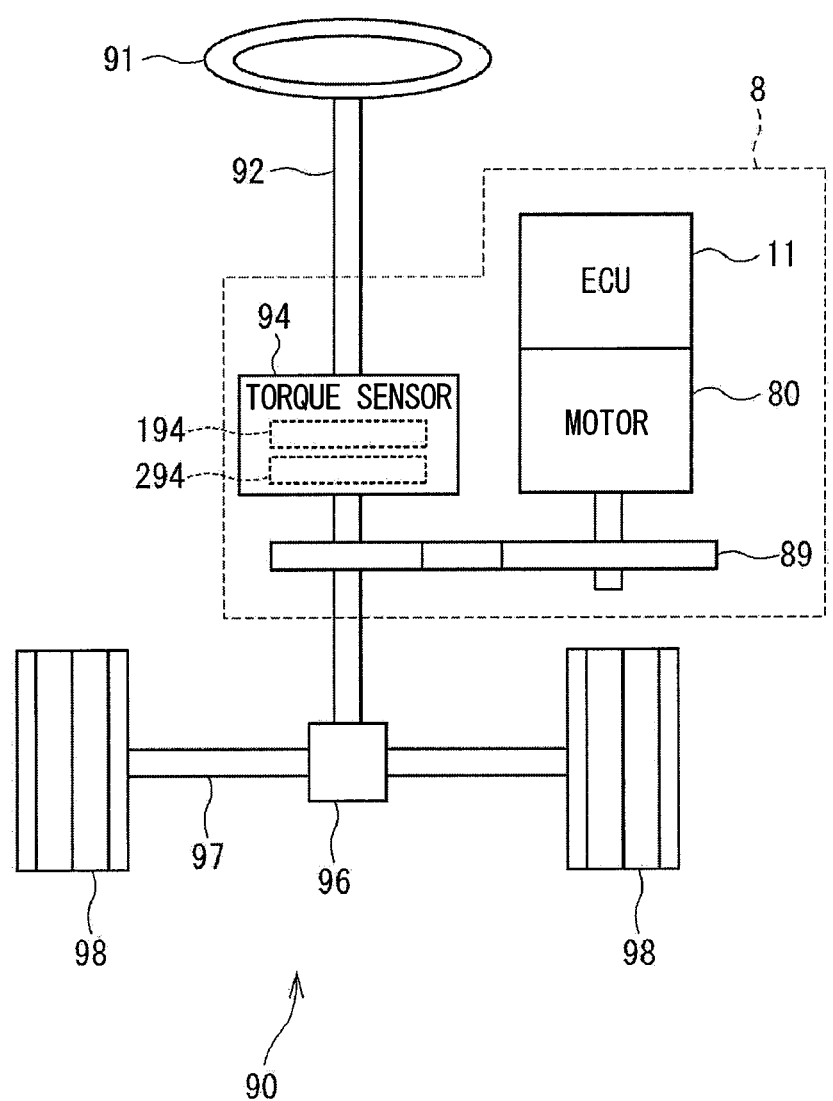
FIG. 1 is a schematic diagram showing a steering system including a steering control apparatus, in which a steering angle detection device according to a first embodiment is used.

A steering angle detection device will be described below with reference to the accompanying drawings. In the following plural embodiments, substantially identical structural elements are designated with the same reference numerals thereby to simplify the description.

First Embodiment

Figure 2:
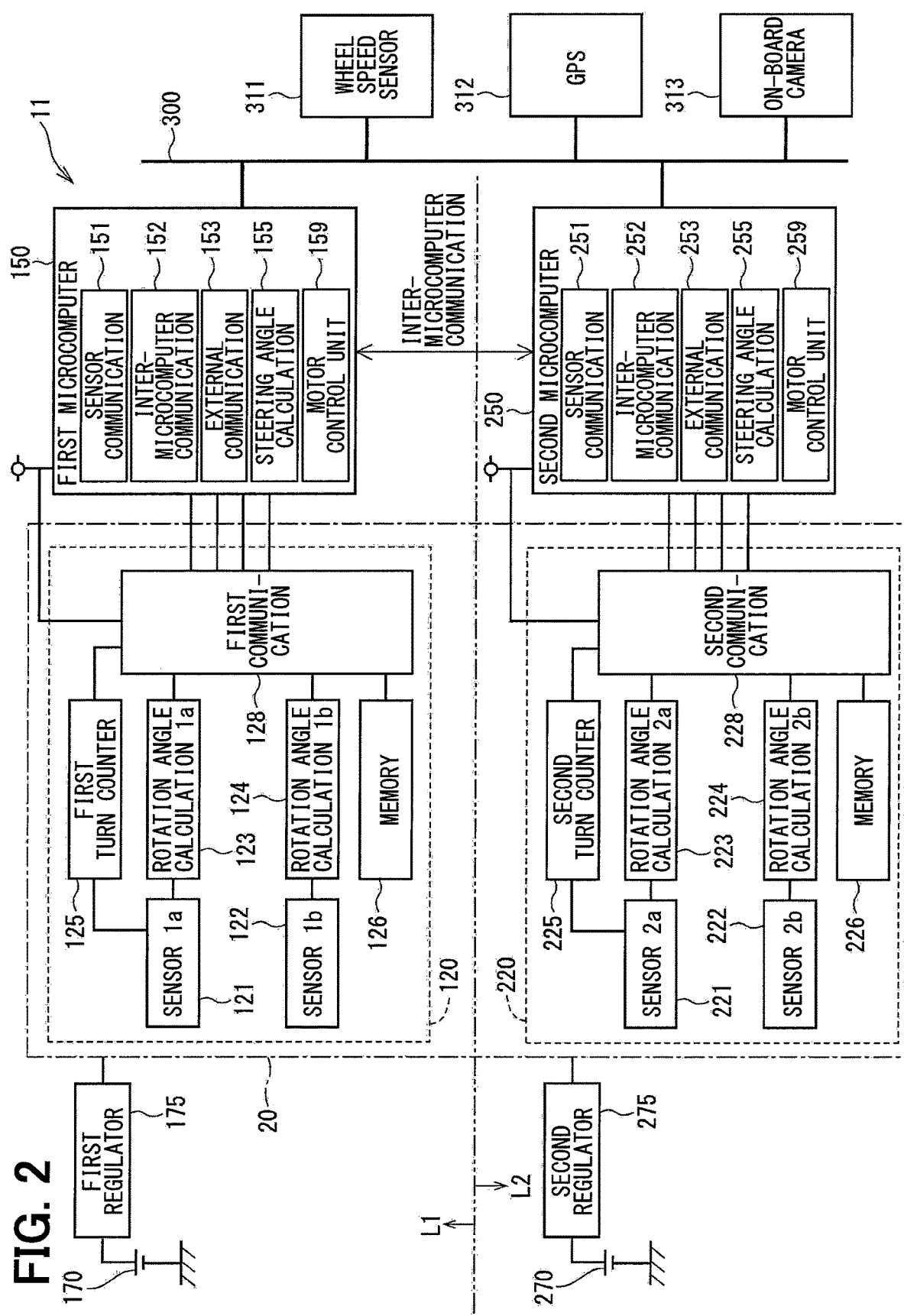
FIG. 2 is a block diagram showing the steering angle detection device according to the first embodiment.
Figure 3:
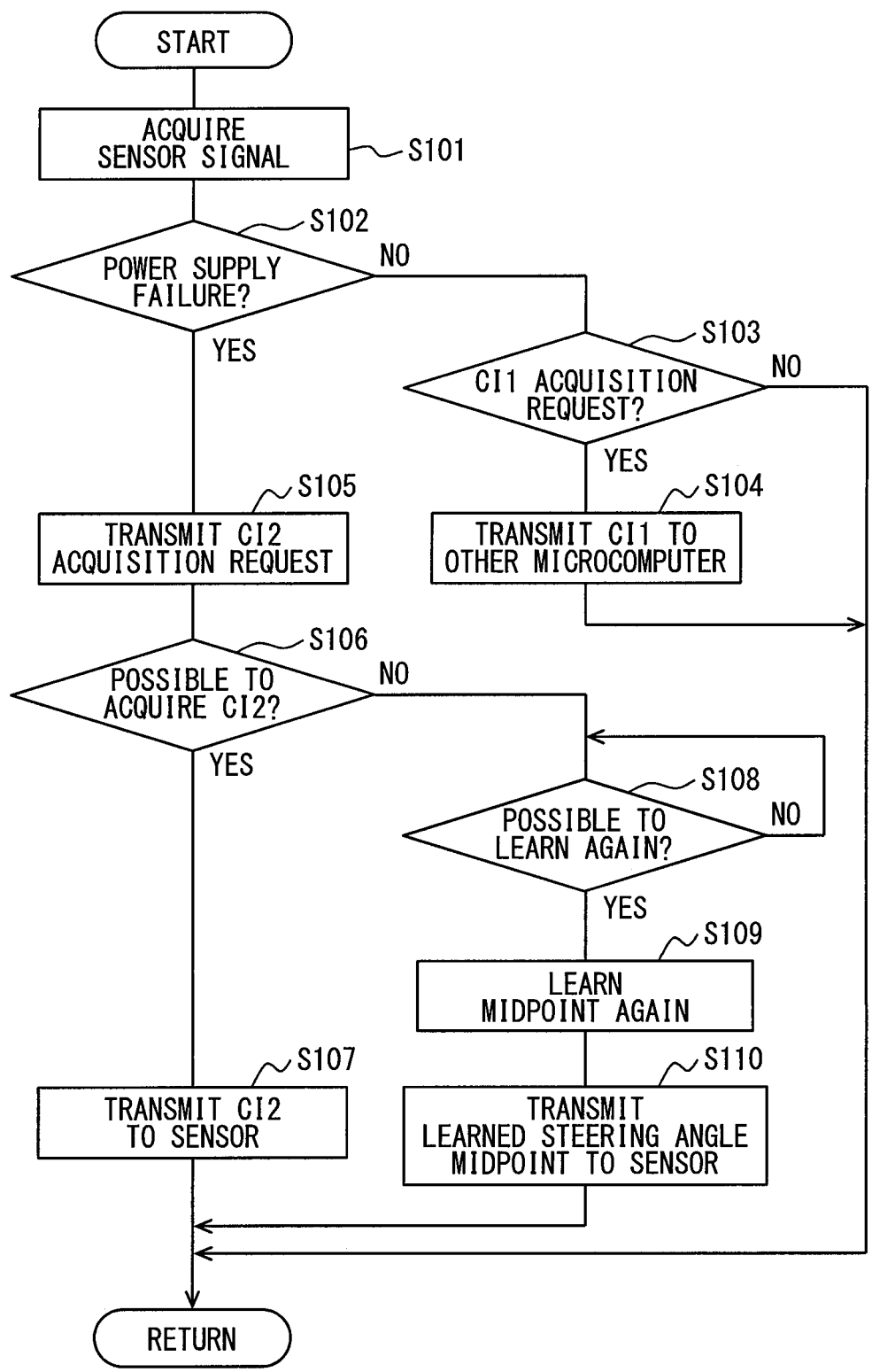
FIG. 3 is a flowchart showing a neutral point correction process executed in the first embodiment.

A steering angle detection device according to a first embodiment and an electric power steering device using the same are shown in FIG. 1 to FIG. 3. As shown in FIG. 1, a steering angle detection device 11 is provided as an electronic control unit (ECU) and incorporated in an electric power steering apparatus (EPS) 8 for assisting a steering operation of a vehicle.

FIG. 1 shows an overall configuration of a steering system 90 including the electric power steering apparatus 8. The steering system 90 includes a steering wheel 91 which is a steering member, a steering shaft 92, a pinion gear 96, a rack shaft 97, road wheels 98 and the electric power steering apparatus 8.

The steering wheel 91 is connected to the steering shaft 92. A torque sensor 94 is provided in the steering shaft 92 to detect a steering torque. The torque sensor 94 has a torsion bar (not shown). The torsion bar coaxially connects an upper side and a lower side of the steering shaft 92. The torque sensor 94 includes a first sensor unit 194 and a second sensor unit 294. A detection value of the first sensor unit 194 is output to a first control unit 150, and a detection value of the second sensor unit 294 is output to a second control unit 250.

The pinion gear 96 is provided at an axial end of the steering shaft 92. The pinion gear 96 meshes with the rack shaft 97. The road wheels 98 are coupled at both ends of the rack shaft 97 via, for example, tie rods. When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The road wheels 98 are steered to an angle corresponding to a displacement amount of the rack shaft 97.

The electric power steering apparatus 8 includes, in addition to the motor 80 and the steering angle detection device 11, a reduction gear 89 and the like. The reduction gear 89 is a power transmission mechanism that transmits rotation of the motor 80 to the steering shaft 92 in a reduced rotation speed. The electric power steering apparatus 8 of the present embodiment is a column assist type. It may alternatively be a rack assist type that transmits the rotation of the motor 80 to the rack shaft 97. In the present embodiment, the steering shaft 92 is a driven object.

The motor 80 outputs an assist torque for assisting the steering of the steering wheel 91 operated by a driver. The motor 80 is driven with electric power supplied from batteries 170 and 270 (refer to FIG. 2), which are direct current power supply sources, to rotate the reduction gear 89 in forward and reverse directions. The motor 80 is a three-phase brushless motor and has a rotor and a stator (both not shown). The batteries 170 and 270 may have equal or different supply voltages. Further, a converter (not shown) may be provided depending on a voltage.

As shown in FIG. 2, the steering angle detection device 11 includes a sensor unit 20, a first control unit 150, a second control unit 250 and the like. Hereinafter, a combination of the first control unit 150 and a configuration provided in association with the first control unit 150 is referred to as a first system L1. Similarly, a combination of the second control unit 250 and a configuration provided in association with the second control unit 250 is referred to as a second system L2. The configuration related to the first system L1 is basically indicated with reference numerals having 100 and the configuration related to the second system L2 is basically indicated with reference numerals having 200. The lower two digits of the reference numerals of the first system L1 and the second system L2 are the same for the same configuration between the first system L1 and the second system L2. Further, in the drawings, etc., a suffix "1" is attached to reference numerals of the configuration and values related to the first system L1 and a suffix "2" is attached to reference numerals of the configuration and values related to the second system L2 as appropriate. If there is no distinction between the systems L1 and L2, the suffixes are not attached.

The sensor unit 20 has a first rotation angle sensor 120 and a second rotation angle sensor 220. The first rotation angle sensor 120 and the second rotation angle sensor 220 function independently of each other. In the present embodiment, the rotation angle sensors 120 and 220 form one sensor unit 20, but may be separately provided. The first rotation angle sensor 120 includes first sensor elements 121 and 122, first rotation angle calculation units 123 and 124, a first turn counter 125 as a first rotation number calculation unit, a first memory 126, and a first communication unit 128. The second rotation angle sensor 220 includes second sensor elements 221 and 222, second rotation angle calculation units 223 and 224, a second turn counter 225 as a second rotation number calculation unit, a second memory 226, and a second communication unit 228.

The sensor elements 121, 122, 221 and 222 are configured to detect the rotation angles of the motor 80. In the present embodiment, the sensor elements 121, 122, 221 and 222 are arranged at locations to face a magnet (not shown) which is provided on a tip end of a shaft that rotates integrally with a rotor (not shown) of the motor 80 in the conventional manner, and are magnetism detection elements which detect magnetic field that changes with rotation of the rotor. Here, the motor 80 is connected to the steering shaft 92 via the reduction gear 89. An integrated value of the rotation angle $\theta m$, which is a mechanical angle of the motor 80, can be converted to a rotation angle $\theta s$ of the steering shaft 92 by converting it using a gear ratio of the reduction gear 89. That is, detecting a change in the rotation angle $\theta m$ of the motor 80 can be understood as detecting a change in the steering angle $\theta s$. In the present embodiment, in order to distinguish detection values of the sensor elements, a detection value of the sensor element 121 is indicated with "1a" and a detection value of the sensor element 122 is indicated with "1b." Similarly, a detection value of the sensor element 221 is indicated with "2a" and a detection value of the sensor element 222 is indicated with "2b."

The rotation angle calculation unit 123 is configured to calculates a rotation angle $\theta m1a$ of the motor 80 based on a detection signal of the sensor element 121, The rotation angle calculation unit 124 is configured to calculate a rotation angle $\theta m1b$ of the motor 80 based on a detection signal of the sensor element 122. The rotation angle calculation unit 223 is configured to calculate a rotation angle $\theta m2a$ of the motor 80 based on a detection signal of the sensor element 221, The rotation angle calculation unit 224 is configured to calculate a rotation angle $\theta m2b$ of the motor 80 based on a detection signal of the sensor element 222. Here, the rotation angles $\theta m1a$, $\theta m1b$, $\theta m2a$ and $\theta m2b$ are mechanical angles, but any value may be used as long as such a value can be used for steering angle calculation.

The turn counter 125 is configured to calculate a rotation number TC1 of the motor 80 based on the detection signal of the sensor element 121. The turn counter 225 is configured to calculate a rotation number TC2 of the motor 80 based on the detection signal of the sensor element 221. The rotation number referred to in the present embodiment is not a rotation number (rotation speed) represented by a unit rpm or the like, but a value indicating the number of rotations, that is. "how many rotations of the rotor have been made." The rotation number TC1 and TC2 may be any values that can be converted into the rotation number, such as a count number acquired by dividing one rotation of the rotor into a plurality of areas.

The memory 126 stores a steering angle midpoint MP1, which is the rotation number TC1 when the steering wheel 91 is in the neutral state. The memory 226 stores a steering angle midpoint MP2, which is the rotation number TC2 when the steering wheel 91 is in the neutral state. In the present embodiment, the rotation numbers TC1 and TC2 when the steering wheel 91 is corrected to be in the neutral position at the time of assembling the rotation angle sensors 120 and 220 are set to 0. The rotation numbers TC1=0 and TC2=0 are stored as the steering angle midpoints MP1 and MP2. In the present embodiment, the steering angle midpoints MP1 and MP2 are used as midpoint information. The memories 126 and 226 in the present embodiment are volatile memories such as a RAM.

The communication unit 128 is configured to transmit first sensor signals, which include the rotation angles $\theta m1a$, $\theta m1b$, the rotation number TC1, the steering angle midpoint MP1 and a status signal indicating an abnormality check result of the first rotation angle sensor 120, to the first control unit 150 by, for example, digital communication such as SPI (Serial Peripheral Interface) communication. The communication unit 228 is configured to transmit second sensor signals, which include the rotation angles $\theta m2a$, $\theta m2b$, the rotation number TC2, the steering angle midpoint MP2 and a status signal indicating an abnormality check result of the second rotation angle sensor 120, to the second control unit 250 by, for example, digital communication such as SPI (Serial Peripheral Interface) communication. The steering angle midpoints MP1 and MP2 may be transmitted each time, or may be transmitted with a predetermined frequency, or transmitted only the first time when a start switch such as an ignition switch (IG) of a vehicle is turned on.

Electric power is supplied to the first rotation angle sensor 120 from the first battery 170 through a first regulator 175. Thus, even in case that the start switch of the vehicle, is in the off-state, the rotation angle sensor 120 can continue operation with the power supplied from the first battery 170 through the regulator 175. In the present embodiment, in case that the start switch is in the off-state, at least counting of the rotation number TC1 by the turn counter 125 is continued.

Further, with the power supply from the first battery 170, the steering angle midpoint MP1 stored in the memory 126 is held even while the start switch is turned off. When a power supply failure occurs in which the power supply from the battery 170 is interrupted, the steering angle midpoint MP1 stored in the memory 126 is lost. Therefore, when the steering angle midpoint MP1 is lost, it is possible to determine that a power supply failure abnormality has occurred while the start switch is in the off-state.

Electric power is supplied to the second rotation angle sensor 220 from the second battery 270 through a second regulator 275. Thus, even in case that the start switch of the vehicle is in the off-state, the rotation angle sensor 120 can continue operation with the power supplied from the second battery 270 through the regulator 275. In the present embodiment, in case that the start switch is in the off-state, at least counting of the rotation number TC2 by the turn counter 225 is continued.

Further, with the power supply from the second battery 270, the steering angle midpoint MP2 stored in the memory 226 is held even while the start switch is turned off. When a power supply failure occurs in which the power supply from the battery 270 is interrupted, the steering angle midpoint MP2 stored in the memory 226 is lost. Therefore, when the steering angle midpoint MP2 is lost, it is possible to determine that a power supply failure abnormality has occurred while the start switch is in the off-state. Information related to whether the power supply failure abnormality has occurred during the start switch off-state period is included in the sensor signal as the status signal and transmitted to the corresponding control unit 150, 250.

The first control unit 150 includes a sensor communication unit 151, an inter-microcomputer communication unit 152, an external communication unit 153, a steering angle calculation unit 155 and a motor control unit 159. The second control unit 250 includes a sensor communication unit 251, an inter-microcomputer communication unit 252, an external communication unit 253, a steering angle calculation unit 255 and a motor control unit 259.

Each of the control units 150 and 250 is mainly composed of a microcomputer and internally includes, although not shown, a CPU, a ROM (read-only non-transitory tangible memory device), an I/O and a bus line for connecting these components. Various processes executed in the control units 150 and 250 may be software processes of a computer program stored in the tangible memory device such as the ROM and executed by the CPU, or may be hardware processes executed by dedicated special electronic circuits. Whether the functions of the units 151 to 159 and 251 to 259 are executed by software or hardware, each unit is understood as being configured to execute each intended function. The control units 150 and 250 are turned on to operate when the start switch is turned on, and turned off after the shutdown process and the like are finished when the start switch is turned off. That is, when the start switch is turned off, various arithmetic processes and the like in the control units 150 and 250 are not executed.

The inter-microcomputer communication units 152 and 252 mutually transmit and receive various types of information between the control units 150 and 250. Hereinafter, the communication between the control units 150 and 250 is referred to as inter-computer communication. As a communication method between the control units 150 and 250, any method such as serial communication like SPI or SENT, CAN communication or the like may be employed.

The external communication units 153 and 253 are connected to a vehicle communication network 300 such as CAN (Controller Area Network). As the vehicle communication network 300 other than CAN, a network of any standard such as CAN-FD (CAN with Flexible Data Rate) or FlexRay may be used. The vehicle communication network 300 is connected to a wheel speed sensor 311, a GPS (Global Positioning System) receiver 312, an on-vehicle camera 313, and the like. The external communication unit 153 can acquire information from the wheel speed sensor 311, the GPS receiver 312, the on-vehicle camera 313 and the like via the vehicle communication network 300.

The steering angle calculation unit 155 calculates the steering angle $\theta s1$, which is a rotation angle of the steering shaft 92, based on the rotation angles $\theta m1a$, $\theta m1b$, the rotation number TC1, the gear ratio of the reduction gear 89 and the like. The steering angle calculation unit 255 calculates the steering angle $\theta s2$, which is a rotation angle of the steering shaft 92, based on the rotation angles $\theta m2a$, $\theta m2b$, the rotation number TC2, the gear ratio of the reduction gear 89 and the like.

Here, the steering angles $\theta s1$ and $\theta s2$ are absolute steering angles corresponding to the amount of rotation based on the rotational position of the motor 80 when the steering wheel 91 is in the neutral position. The absolute steering angle is a value necessary for automatically operating the vehicle in automatic parking, automatic traveling and the like. The rotation numbers TC1 and TC2, which are the numbers (counts) of rotations, and the steering angle midpoints MP1 and MP2 used for calculation of the steering angles $\theta s1$ and vs2 are pieces of information that need to be held even during the off-state of the start switch. On the other hand, the rotation angles $\theta m1$ and $\theta m2$ need not be held during the off-state of the start switch. It is thus sufficient to use an instantaneous value after the start switch is turned on. From the viewpoint of power saving, it is preferable to stop the calculation of the rotation angles $\theta m1$ and $\theta m2$ during the off-state of the start switch. However, the calculation of the rotation angles $\theta m1$ and $\theta m2$ may be continued even during the off-state of the start switch. The motor control units 159 and 259 control driving of the motor 80 based on the detection values of the rotation angle sensors 120 and 220, a detection value of a current sensor (not shown) and the like.

Hereinafter, it is assumed in the following description that a power supply failure abnormality occurs in the first system L1 but the second system L2 is normal. When the power supply failure abnormality occurs in the first system L1 while the start switch is in the off-state, the rotation number TC1 of the motor 80 during the power supply failure cannot be monitored. Therefore, the steering angle $\theta s1$ calculated using the rotation number TC1 after power supply failure and the steering angle midpoint MP1 may differ from the actual steering angle, and at least one of the steering angle midpoint MP1 and the rotation number TC1 need be set again. The same applies to a case where the steering angle midpoint MP1 is stored in the non-volatile memory.

In case that the second system L2 is not provided, that is, in case of only one system, it is necessary to re-learn the steering angle midpoint MP1 during a period in which the vehicle travels actually with the steering wheel 91 being in the neutral state, Therefore, when the power supply failure abnormality occurs, the steering angle calculation cannot be performed until the steering angle midpoint MP1 is re-learned after the start switch is turned on.

The steering angle detection device 11 of the present embodiment includes two sets of rotation angle sensors 120 and 220 and control units 150 and 250, and power is supplied separately from two batteries 170 and 270 for each system of the set of the rotation angle sensors and the control units. Therefore, even if the power supply failure abnormality occurs in one of the systems, it is possible to perform the steering angle calculation by acquiring the rotation number and the steering angle midpoint of the other system in which the power supply failure abnormality does not occur and correcting the steering angle midpoint, without performing the re-learning process which needs traveling of a vehicle.

Here, a specific example of the midpoint correction will be described. For example, it is assumed that the rotation numbers TC1 and TC2 are 10 and the steering angle midpoints MP1 and MP2 are 0 before the start switch is turned off. It is further assumed that the power supply failure abnormality occurs in the first system L1 while the start switch is in the off-state, and the rotation number TC1 is 10 and the rotation number TC2 is 20 when the start switch is turned on. In this state, the steering angle midpoint MP1 of the first system L1 can be calculated as −10. In the present embodiment, the rotation number TC2 and the steering angle midpoint MP2 acquired from the second control unit 250 are transmitted from the first control unit 150 to the first rotation angle sensor 120, and the information in the first rotation angle sensor 120 is rewritten so that the current rotation number TC1 becomes 20 (TC=20) and the steering angle midpoint MP1 becomes 0 (MP=0).

A midpoint correction process executed in the present embodiment will be described with reference to a flowchart of FIG. 3. This process is executed by the control units 150 and 250 as software processing when the start switch is switched from the off-state to the on-state. Here, processing executed by the first control unit 150 will be described as an example. The processing in the second control unit 250 is the same as that of the first control unit 150 and hence the description will be omitted. The processing in the second control unit 250 will be understood by assuming that the self system is the second system L2 and the first system is the other system. Hereinafter, "step" of step number such as S101 is simply indicated as a symbol S. The same applies to the second embodiment.

In S101, the sensor communication unit 151 acquires the sensor signal from the first rotation angle sensor 120. In S102, the first control unit 150 checks, based on the sensor signal acquired from the first rotation angle sensor 120, whether a power supply failure abnormality has occurred during the start switch off-state period. If it is determined that the power supply failure abnormality has occurred while the start switch is in the off-state (S102: YES), the process proceeds to S105. If it is determined that the power supply failure abnormality has not occurred while the start switch is in the off-state (S102: NO), the process proceeds to S103. If there is no power supply failure abnormality during the start switch off-state period, the steering angle calculation unit 155 can calculate the steering angle θs1 using the steering angle midpoint MP1 calculated before the start switch was turned off.

In S103, the first control unit 150 checks whether there is a request for acquisition of correction information from the second control unit 250. The correction information includes the rotation number and the steering angle midpoint. Hereinafter, the rotation number TC1 and steering angle midpoint MP1 of the first system L1 will be referred to as correction information CI1, and the rotation number TC2 and steering angle midpoint MP2 of the second system L2 will be referred to as correction information CI2. If it is determined that there is a request for acquiring the correction information CI1 (S103: YES), the process proceeds to S104. The first control unit 150 transmits the rotation number TC1 and the steering angle midpoint MP1 as the correction information CI1 to the second control unit 250. If it is determined that there is no request for acquiring the correction information CI1 (S103: NO), the correction information CI1 is not transmitted. Here, the transmission of the correction information CI1 to the second system L2 is assumed as being included in the present processing, but the processes of S103 and S104 may be executed as separate processing.

In S105, to which the process proceeds when it is determined that there is the power supply failure abnormality during the start switch off-state period (S102: YES), the first control unit 150 transmits an acquisition request for the correction information CI2 to the second control unit 250. The acquisition request for the correction information may be transmitted to the second control unit 250 by inter-microcomputer communication, or may be transmitted to the second control unit 250 via the vehicle communication network 300. The same applies to S104.

In S106, the first control unit 150 checks whether the correction information CI2 has been acquired from the second control unit 250. For example, the first control unit 150 cannot acquire the correction information CI2 from the second control unit 250, if the power supply failure abnormality occurs or failure in the inter-microcomputer communication occurs. In case it is determined that the correction information CI2 has been acquired (S106: YES), the process proceeds to S107. In case it is determined that the correction information CI1 could not be acquired (S106: NO), the process proceeds to S108. In S107, the first control unit 150 transmits the correction information CI2 to the first rotation angle sensor 120. The first rotation angle sensor 120 rewrites the current rotation number TC1 and the steering angle midpoint MP1 based on the received correction information CI2.

In S108, the first control unit 150 checks whether re-learning of the steering angle midpoint MP1 is possible. When the vehicle is moving straight ahead at a predetermined speed or more, it is determined that the re-learning of the steering angle midpoint MP1 is possible. The straight movement can be checked based on, for example, a detection value of the wheel speed sensor 311, GPS information from the GPS receiver 312, data of the in-vehicle camera 313 and the like. If it is determined that the re-learning of the steering angle midpoint MP1 cannot be made (S108: NO), this determination process is repeated. If it is determined that re-learning of the steering angle midpoint MP1 is possible (S108: YES), the process proceeds to S109.

In S109, the first control unit 150 re-learns the steering angle midpoint MP1 based on the rotation number TC1 made when the vehicle travels straight. In S110, the first control unit 150 transmits the re-learned steering angle midpoint MP1 to the first rotation angle sensor 120. The first rotation angle sensor 120 rewrites at least one of the current rotation number TC1 and the steering angle midpoint MP1 according to the steering angle midpoint MP1 that has been re-learned.

In the present embodiment, even when the power supply failure abnormality occurs in the first system L1 in the start switch off-state, if the second system L2 is normal, the first control unit 150 acquires the steering angle midpoint MP2 and the rotation number TC2 from the control unit 250 as the correction information CI2 when the start switch is turned on if the second system L2 is normal, Then, the first control unit 150 transmits the steering angle midpoint MP2 and the rotation number TC2 to the first rotation angle sensor 120. The first rotation angle sensor 120 rewrites the steering angle midpoint MP1 and the rotation number TC1 based on the steering angle midpoint MP2 and the rotation number TC2. When the first system L1 is normal but the power supply failure abnormality occurs in the second system L2, the second control unit 250 receives the steering angle midpoint MP1 and the rotation number TC1 as the correction information CI2 from the first control unit 150 and corrects the steering angle midpoint MP2 and the rotation number TC2. As a result, since the re-learning of the steering angle midpoint MP1, MP2, which needs the straight traveling, becomes unnecessary, the correction process of the steering angle midpoint MP1, MP2 at the time of the power supply failure abnormality can be performed at high speed without adding circuit components.

As described above, the steering angle detection device 11 according to the present embodiment includes a plurality of rotation angle sensors 120, 220 and a plurality of control units 150, 250. The first rotation angle sensor 120 includes the sensor elements 121, 122, the rotation angle calculation units 123, 124, the turn counter 125 and the communication unit 128. The second rotation angle sensor 220 includes the sensor elements 221, 222, the rotation angle calculation units 223, 224, the turn counter 225 and the communication unit 228. The sensor elements 121, 122, 221 and 222 detect the rotation states of the motor 80 coupled to the steering system 90 via the reduction gear 89.

The rotation angle calculation units 123 and 124 calculate the rotation angle θm1 of the motor 80 based on the detection signals of the sensor elements 121 and 122. The rotation angle calculation units 223 and 224 calculate the rotation angle θm2 of the motor 80 based on the detection signals of the sensor elements 221 and 222. The turn counter 125 calculates the rotation number TC1 of the motor 80 based on the detection signals of the sensor elements 121 and 122. The turn counter 225 calculates the rotation number TC2 of the motor 80 based on the detection signals of the sensor elements 221 and 222.

The communication unit 128 outputs the sensor signal including the information related to the rotation angle θm1 and the rotation number TC1. The communication unit 228 outputs the sensor signal including the information related to the rotation angle θm2 and the rotation number TC2. The rotation angle sensors 120 and 220 can continue calculation of at least the rotation number TC1 and TC2 while the start switch is in the off-state.

The first control unit 150 includes the steering angle calculation unit 155. The steering angle calculation unit 155 calculates the steering angle θs1 based on the rotation number TC1 and the rotation angle θm1 acquired from the first rotation angle sensor 120, which is provided in correspondence to the steering angle calculation unit 155, and the steering angle midpoint MP1 related to the neutral position of the steering wheel 91. The second control unit 250 includes the steering angle calculation unit 255. The steering angle calculation unit 255 calculates the steering angle θs2 based on the rotation number TC2 and the rotation angle θm2 acquired from the second rotation angle sensor 220, which is provided in correspondence to the steering angle calculation unit 255, and the steering angle midpoint MP2 related to the neutral position of the steering wheel 91. In addition, the control units 150 and 250 can mutually transmit and receive information.

Here, the combination of the rotation angle sensors 120, 220 and the control units 150, 250 provided correspondingly form two systems. In the present embodiment, the combination of the first rotation angle sensor 120 and the first control unit 150 form the first system L1, and the combination of the second rotation angle sensor 220 and the second control unit 250 form the second system L2. The batteries 170 and 270 are provided for the first system and the second system, respectively. In the present embodiment, the rotation angle sensors 120 and 220 hold the steering angle midpoints MP1 and MP2 while the start switch is in the off-state.

In case that the power supply failure abnormality occurs in one system, in which the power supply to the rotation angle sensors 120 or 220 is interrupted and the calculation of the rotation number TC1 or TC2 cannot be continued during the start switch is in the off-state, the one system having the power supply failure is regarded as the abnormal system and the other system having no power supply failure is regarded as the normal system. Here, the first system L1 is regarded as the abnormal system and the second system L2 is regarded as the normal system. When the start switch is turned on next time, the control unit 150 of the first system L1 acquires the steering angle midpoint MP2 and the rotation number TC2 from the control unit 250 of the second system L2.

In the present embodiment, the configuration relating to the steering angle detection including the batteries 170 and 270 is a redundant configuration in which a plurality of independent configurations is provided. The rotation number TC2 and the steering angle midpoint MP2 of the second system L2 are normal even when the power supply failure abnormality occurs in the first system L1. Since the control units 150 and 250 can communicate with each other, the first control unit 150 can acquire the steering angle midpoint MP2 and the rotation number TC2, which are normal, from the second control unit 250. Therefore, in the first system L1, at least one of the steering angle midpoint MP1 and the rotation number TC1 used for calculating the steering angle θs1 can be corrected based on the steering angle midpoint MP2 and the rotation number TC2. As a result, even if the power supply failure abnormality occurs in a part of the system, the steering angle calculation can be appropriately performed without adding additional circuit parts and the like. Further, since it is not necessary to re-learn the neutral position by actual traveling, it is possible to shorten the time until the steering angle calculation restart in the abnormal system.

The first control unit 150 of the first system L1, which is the abnormal system, transmits the rotation number TC2 and the steering angle midpoint MP2 acquired from the second control unit 250, which is the normal system, to the first rotation angle sensor 120, so that the first rotation angle sensor 120 corrects the rotation number TC1 and the steering angle midpoint MP1. Thus, the values used for calculating the steering angle θs1 in the first system L1 can be appropriately corrected. In the present embodiment, the rotation number TC2 and the steering angle midpoint MP2 themselves are correction information.

In case that the first control unit 150 of the first system L1 which is an abnormal system cannot acquire the steering angle midpoint MP2 and the current rotation number TC2 from the second control unit 250 of the second system L2 which is the normal system, the first control unit 150 re-learns the steering angle midpoint MP1 based on the rotation number calculated by actually moving the vehicle straight. Thereby, when the midpoint information cannot be acquired from the second control unit 250, the steering angle midpoint MP1 can be appropriately set again.

Second Embodiment

Figure 4:
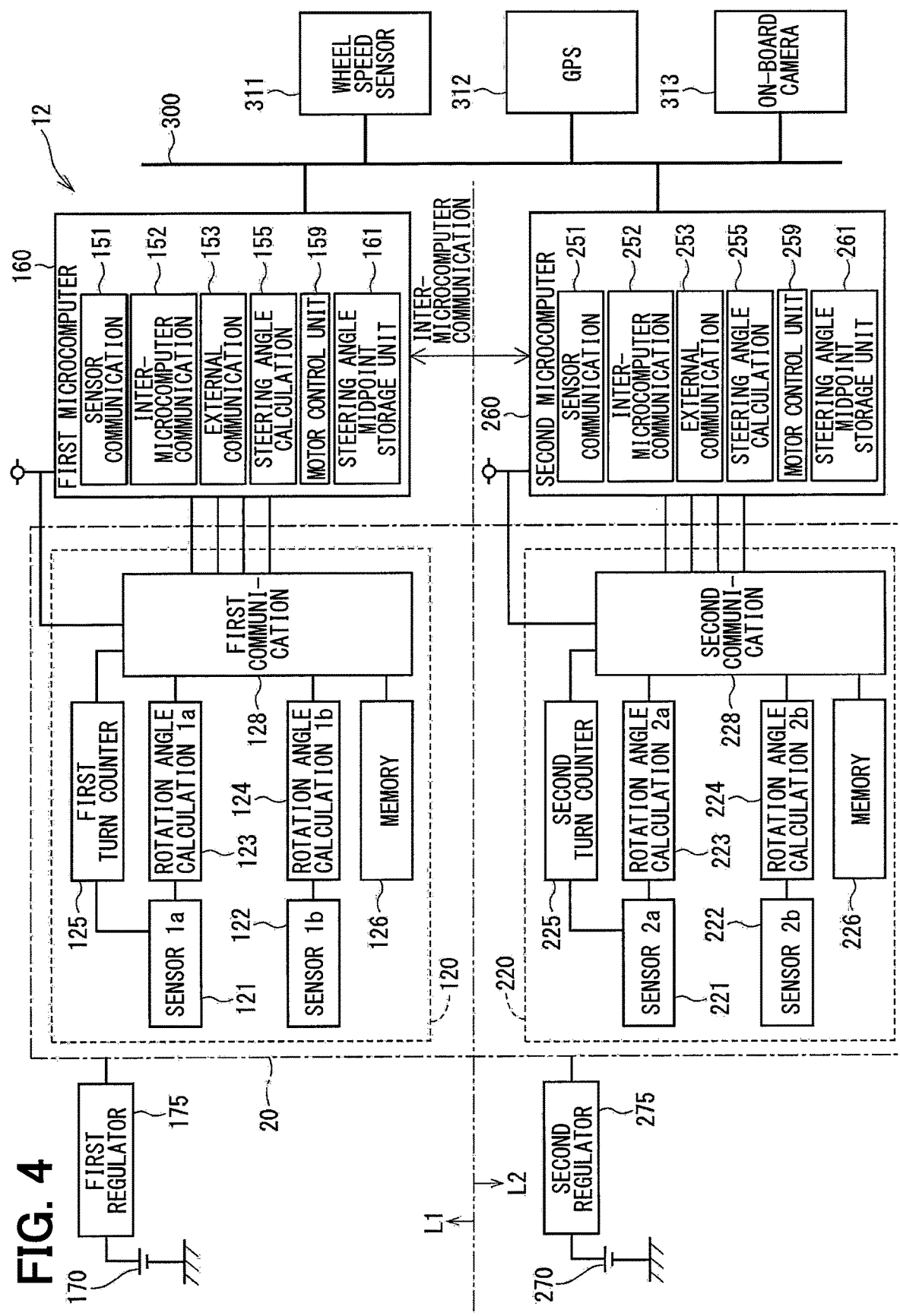
FIG. 4 is a block diagram showing a steering angle detection device according to a second embodiment.
Figure 5:
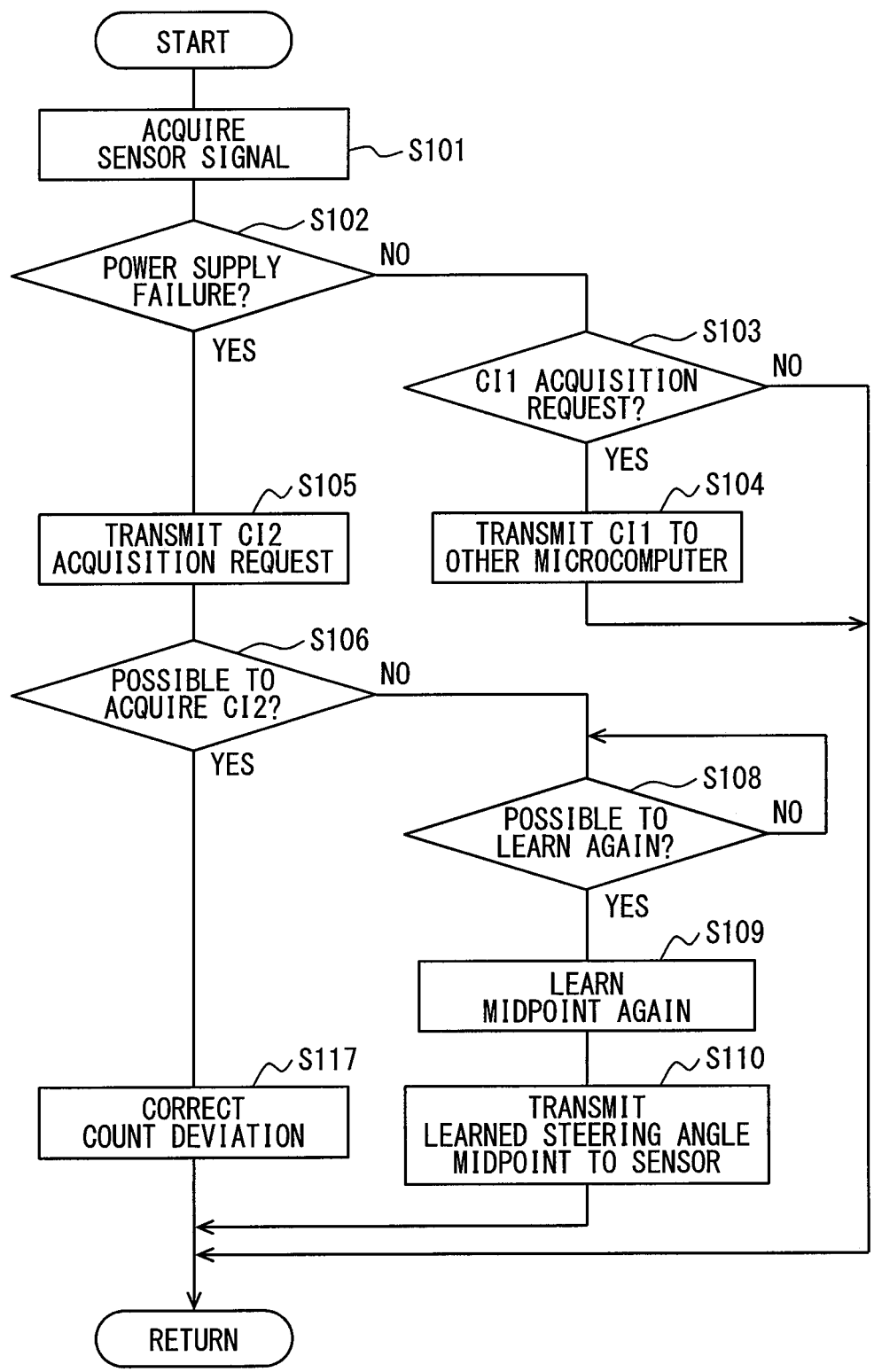
FIG. 5 is a flowchart showing a neutral point correction process executed in the second embodiment.

A steering angle detection device according to a second embodiment is shown in FIG. 4 and FIG. 5. In the present embodiment, the first system L1 is assumed to be the abnormal system, and the second system L2 is assumed to be the normal system. As shown in FIG. 4, a steering angle detection device 12 includes a sensor unit 20, a first control unit 160 and a second control unit 260. The first control 160 has a steering angle midpoint storage unit 161 in addition to the components of the first control unit 150 of the first embodiment. The steering angle midpoint storage unit 161 stores a steering angle midpoint MP1, which is the rotation number TC1 at time when the steering wheel 91 is in the neutral state. The second control unit 260 also has a steering angle midpoint storage unit 261 in addition to the components of the second control unit 250 of the first embodiment. The steering angle midpoint storage unit 261 stores a steering angle midpoint MP2, which is the rotation number TC2 at time when the steering wheel 91 is in the neutral state.

As in the first embodiment, the steering angle midpoints MP1 and MP2 are set so that the rotation number becomes 0 when the steering wheel 91 is corrected to be in the neutral position at time of assembling the rotation angle sensors 120 and 220. In the present embodiment, the steering angle midpoint storage units 161 and 261 are non-volatile memories such as ROMs, and the steering angle midpoints MP1 and MP2 are held even during the start switch off-state period.

In the present embodiment, the steering angle midpoints MP1 and MP2 are not stored in the memories 126 and 226 of the rotation angle sensors 120 and 220, and information such as a flag for detecting a power supply failure abnormality is stored in the memories 126 and 226. For example, the power supply failure flag is set to "0" as an initial value, and to "1" as a normal value when power is supplied. If the memories 126 and 226 are volatile memories, the power supply failure flag returns to the initial value "0" when the power supply failure abnormality occurs. This makes it possible to detect the power supply failure abnormality. In the first embodiment as well described above, the power supply failure abnormality may be detected with reference to the flag or the like.

Here, a specific example of a midpoint information correction will be described. For example, as in the case of the first embodiment, it is assumed that the rotation numbers TC1 and TC2 are 10 and the steering angle midpoints are 0 before the start switch is turned off. It is further assumed that the power supply failure abnormality occurs in the first system L1 while the start switch is in the off-state, and the rotation number TC1 is 10 and the rotation number TC2 is 20 when the start switch is turned on. In this state, the steering angle midpoint MP1 of the first system L1 can be calculated as −10. In the present embodiment, the steering angle calculation unit 155 internally changes the information received from the first rotation angle sensor 120 so that the rotation number TC1=10 and the steering angle midpoint MP1=−10 become the rotation number TC1=20 and the steering angle midpoint MP1=0. For example, the rotation number TC1 can be changed to TC1=20 by adding a correction value Cv1=10 to the rotation number TC1.

A midpoint correction processing executed in the present embodiment will be described with reference to a flowchart of FIG. 5. This processing is executed by the control units 160 and 260 when the start switch is switched from the off-state to the on-state. Here, processing executed by the first control unit 160 will be described as an example. The midpoint correction processing in the present embodiment is the same as the processing described above with reference to the flowchart of FIG. 3 except that S117 is substituted for S107.

In S117, which is executed when the determination in S106 is affirmative, the first control unit 160 corrects internally the count deviation, which is caused by the power supply failure, in the first control unit 160. Specifically, the first control unit 160 calculates the correction value Cv1 for correcting the rotation number TC2 based on the rotation number TC1, which is acquired from the first rotation angle sensor 120, as well as the rotation number TC2 and the steering angle midpoint MP2, which are acquired from the second control unit 260. The steering angle calculation unit 155 calculates the steering angle $\theta s1$ by correcting the rotation number TC1 acquired from the first rotation angle sensor 120 with the correction value Cv1. The correction value Cv1 can also be regarded as a value for correcting the deviation of the steering angle midpoint MP1 caused by the power supply failure. Further, the value of the steering angle midpoint MP1 stored in the steering angle midpoint storage unit 161 may be rewritten by calculating the steering angle midpoint MP1 based on the rotation number TC1, which is acquired from the first rotation angle sensor 120, and the rotation number TC2 and the steering angle midpoint MP2, which are acquired from the second control unit 260.

In the present embodiment, the first control unit 160 of the first system L1 which is assumed to be the abnormal system corrects at least one of the steering angle midpoint MP1 and the rotation number TC1 of the own system based on the steering angle midpoint MP2 and the rotation number TC2 acquired from the second control unit 260 of the second system L2 which is the normal system. Further, the steering angle calculation unit 155 calculates the steering angle $\theta s1$ using the corrected value. In the present embodiment, the first control unit 160 corrects therein the deviation of the steering angle midpoint caused by the power supply failure abnormality. This configuration also provides the similar effect as the embodiment described above.

OTHER EMBODIMENT

In the above embodiment, the memory of the rotation angle sensor is a volatile memory. As another embodiment, the memory of the rotation angle sensor may be a non-volatile memory. In this case, it is desirable to provide a separate configuration for detecting a power supply failure abnormality of a volatile memory provided separately. Further, any method may be used as a method for detecting a power supply failure abnormality. In the first embodiment, when a power supply failure abnormality occurs while the start switch is in the off-state, the control unit transmits the rotation number and the steering angle midpoint itself as the correction information to the rotation angle sensor, and the rotation angle sensor corrects the rotation number and the steering angle midpoint. As another embodiment, the correction information transmitted to the rotation angle sensor is not limited to the rotation number and the steering angle midpoint itself, and may be information such as the amount of deviation of the rotation number in the abnormal system, for example. Further, on the rotation angle sensor side, either the midpoint information or the rotation number may be corrected. As another embodiment, even in case that the midpoint information is held in the rotation angle sensor side, the steering angle may be calculated in the control unit side by correcting the rotation number and the steering angle midpoint as in the second embodiment.

In the second embodiment, when the power supply failure abnormality occurs while the start switch is in the off-state, the steering angle calculation is performed by correcting the rotation number and the steering angle midpoint in the control unit side. As another embodiment, even in case that the midpoint information is held in the control unit side, correction information may be transmitted to the rotation angle sensor and at least one of the rotation number and the midpoint information may be corrected in the rotation angle sensor side as in the first embodiment, Still further, in case that the correct steering angle is available in the other device, at least one of the rotation number and the midpoint information may be corrected based on the steering angle information acquired from the other device via the vehicle communication network.

In the above embodiments, two control units are provided. According to another embodiment, the number of control units may be three or more. In the above embodiments, one rotation angle sensor is provided for each control unit. As another embodiment, a plurality of rotation angle sensors may be provided for each control unit. Further, in the above embodiments, the rotation angle sensor is provided with two sensor elements, two rotation angle calculation units and one rotation number calculation unit. As another embodiment, each of the number of sensor elements, the number of rotation angle calculation units and the number of rotation number calculation units may be one or more. In the above embodiments, the steering angle is the rotation angle of the steering shaft. As another embodiment, the steering angle may be a value such as a steering angle, a pinion angle, a tire angle, and an integrated value of a motor rotation angle at any gear point.

In the above embodiments, the steering angle detection device is applied to the electric power steering apparatus. As another embodiment, the steering angle detection device may be applied to any other apparatuses different from the electric power steering apparatus. The present disclosure is not limited to the embodiments described above but various modifications may be made within the scope of the present disclosure.

The present disclosure has been made in accordance with the embodiments. However, the present disclosure is not limited to such embodiments and configurations. That is, the present disclosure also encompasses various modifications and variations within the scope of equivalents. Furthermore, various combination and formation, and other combination and formation including one, more than one or less than one element may be made in the present disclosure.

What is claimed is:

1. A steering angle detection device comprising:
a plurality of rotation angle sensors, each of which includes a sensor element configured to detect a rotation state of a motor connected to a steering system through a power transmitting device, a rotation angle calculation unit configured to calculate a rotation angle of the motor based on a detection signal of the sensor element, a rotation number calculation unit configured to calculate a rotation number indicating a number of rotations of the motor based on the detection signal of the sensor element, and a communication unit configured to communicate a sensor signal including information related to the rotation angle and the rotation number, the plurality of rotation angle sensors being configured to continue calculation of at least the rotation number during a period in which a start switch of a vehicle is in an off-state; and
a plurality of control units, each of which includes a steering angle calculation unit configured to calculate a steering angle based on midpoint information related to a neutral position of a steering member in addition to the rotation number and the rotation angle acquired from a corresponding one of the plurality of rotation angle sensors, wherein:
the plurality of rotation angle sensors and the plurality of control units form a plurality of systems, respectively, each of which includes a battery;
the plurality of rotation angle sensors or the plurality of control units is configured to hold the midpoint information during the off-state of the start switch;
the control unit of an abnormal system of the plurality of systems is configured to acquire the midpoint information and the rotation number from the control unit of a normal system of the plurality of systems, the abnormal system having a power supply failure abnormality and the normal system not having a power supply failure abnormality,
for a state in which the power supply failure abnormality occurs, the power supply failure abnormality indicates that a power supply to the plurality of rotation angle sensors is interrupted and calculation of the rotation number is disabled during the off-state of the start switch;
the control unit of the abnormal system is configured to correct at least one of the midpoint information and the rotation number of the abnormal system based on the midpoint information and the rotation number acquired from the control unit of the normal system; and
the steering angle calculation unit of the abnormal system is configured to calculate the steering angle by using the midpoint information and the rotation number acquired from the control unit of the normal system.

2. The steering angle detection device according to claim 1, wherein:
the control unit of the abnormal system is configured to transmit correction information, which corresponds to the midpoint information and the rotation number acquired from the control unit of the normal system, to the rotation angle sensor of the abnormal system, and corrects at least one of the midpoint information and the rotation number in the rotation angle sensor.

3. The steering angle detection device according to claim 1, wherein:
at least one of the midpoint information and the rotation number is corrected based on steering angle information acquired from an other device through a vehicle communication network.

4. The steering angle detection device according to claim 1, wherein:
the control unit of the abnormal system is configured to re-learn the midpoint information based on the rotation number at time of straight traveling of the vehicle, when the control unit of the abnormal system cannot acquire the midpoint information and a current rotation number of present time from the control unit of the normal system.

5. A steering angle detection device comprising:
first and second rotation angle sensors, each of which includes a sensor element configured to detect a rotation state of a motor connected to a steering system through a power transmitting device, and is configured to calculate a rotation angle of the motor based on a detection signal of the sensor element, to calculate a rotation number indicating a number of rotations of the motor based on the detection signal of the sensor element, and to communicate a sensor signal including information related to the rotation angle and the rotation number, the first and second rotation angle sensors being configured to continue calculation of at least the rotation number during a period in which a start switch of a vehicle is in an off-state; and first and second microcomputers each programmed to execute programmed processes of calculating a steering angle based on midpoint information related to a neutral position of a steering member in addition to the rotation number and the rotation angle acquired from a corresponding one of the first and second rotation angle sensors, wherein:

the first rotation angle sensor and the first microcomputer form a first system including a first battery, and the second rotation angle sensor and the second microcomputer form a second system including a second battery;

either one of the first rotation angle sensor and the first microcomputer has a first memory which holds the midpoint information during the off-state of the start switch, and either one of the second rotation angle sensor and the second microcomputer has a second memory which holds the midpoint information during the off-state of the start switch;

the first microcomputer executes a process of acquiring the midpoint information and the rotation number from the second system, when the first system has a power supply failure abnormality indicating a power supply form the first battery to the first rotation angle sensor is interrupted and calculation of the rotation number is disabled during the start switch is in the off-state, and the second system has no power supply failure abnormality;

the first microcomputer executes a process of correcting at least one of the midpoint information and the rotation number of the first system based on the midpoint information and the rotation number acquired from the first control unit of the first system; and the first microcomputer executes a process of calculating the steering angle by using the midpoint information and the rotation number acquired from the first control unit of the first system.

6. The steering angle detection device according to claim 5, wherein:

the first microcomputer executes a process of transmitting correction information, which corresponds to the midpoint information and the rotation number acquired from the second system, to the first rotation angle sensor, so that at least one of the midpoint information and the rotation number is corrected in the first rotation angle sensor.

7. The steering angle detection device according to claim 5, wherein:

at least one of the midpoint information and the rotation number is corrected based on steering angle information acquired from an other device through a vehicle communication network.

8. The steering angle detection device according to claim 5, wherein:

the first microcomputer executes a process of re-learning the midpoint information based on the rotation number at time of straight traveling of the vehicle, when the first microcomputer cannot acquire the midpoint information and a current rotation number of present time from the second system.

* * * * *